Oct. 30, 1951  E. J. VERDICK ET AL  2,573,233
LEVER TYPE TIRE BEAD LOOSENING TOOL
Filed May 14, 1949

INVENTORS.
E. J. VERDICK
J. L. WHITE
BY
Merrill M. Blackburn
ATTORNEY

Patented Oct. 30, 1951

2,573,233

UNITED STATES PATENT OFFICE 2,573,233

LEVER TYPE TIRE BEAD LOOSENING TOOL

Edmund J. Verdick and Joseph L. White, Annawan, Ill.

Application May 14, 1949, Serial No. 93,259

1 Claim. (Cl. 157—1.26)

The present invention relates to a tool for removing tires, particularly pneumatic tires, from rims, especially if the tires are stuck to the rims, as when they are held in place by rust. It is the primary purpose of this invention to provide a means for separating tires from rims so that it will be possible to remove a tire, partially or entirely, even though it may be stuck in place. It is also a purpose of this invention to provide means for making easier the removal of large tires from large wheels. It is also a purpose of our invention to provide such other objects, advantages, and capabilities as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Figure 1:
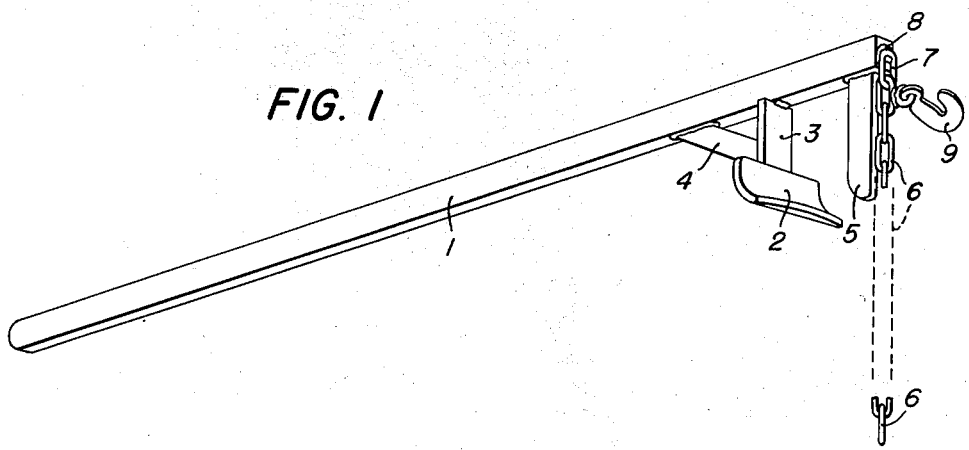
Fig. 1 is a perspective view of this tool.
Figure 2:
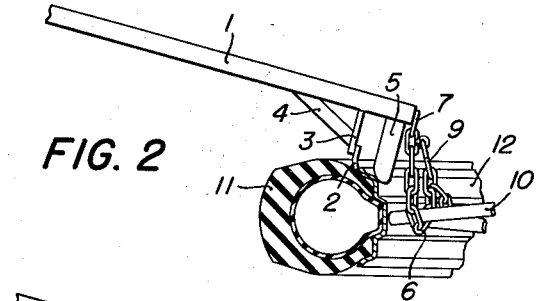
Fig. 2 shows a cross-section of a tire and rim of one type, with the tool of this invention applied thereto in operative position.
Figure 3:
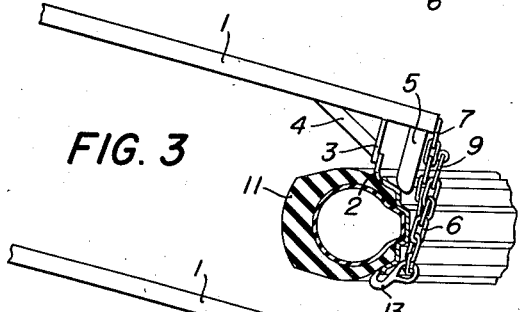
Fig. 3 shows another type of wheel, with the tool in operative position.
Figure 4:
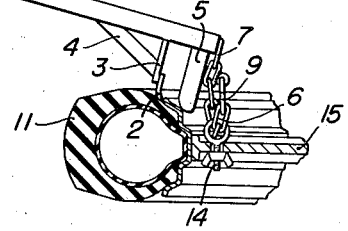
Fig. 4 shows still another type of wheel, with the tool in operative position.

Reference will now be made in greater detail to the annexed drawings for a fuller explanation of this invention. A handle 1 has a part 2, referred to as a spade, connected thereto by an arm 3, and a brace 4 connects the handle and arm 3 for the purpose of furnishing strengthening means sometimes needed. At the end of the handle is an arm 5, the purpose of which is to prevent the tool from sliding relatively to the work, as is shown in Figs. 2, 3, and 4. A chain 6 has its end loop 7 welded to the end of the handle, as shown at 8, and also has a hook 9 connected thereto, pivotally.

Depending upon the type of wheel from which it is desired to remove the tire, the tool will be applied in one of the modes shown in Figs. 2, 3, and 4. If the wheel is provided with spokes, then the tool will be applied as shown in Fig. 2, in which the chain 6 is shown as passing around a spoke and then attached to the hook 9, the spade 2 being placed between the rim 12 and the tire 11. Then when force is applied to the handle 1, the spade 2 forces the tire 11 away from the outer part of the rim 12.

If the rim is of the type which is demountable from the wheel, as shown in Fig. 3, then a hook 13, having an eye which is large enough to receive the chain 6, is attached to the remote edge of the rim and the chain is passed through the wheel and the eye of the hook 13 and back to the hook 9 to which it is attached. Then pressure may be exerted on the handle 1 with the result that the spade 2 forces the tire away from the rim, making the removal of the tire possible.

If the wheel is a disc type, as shown in Fig. 4, then a screw eye 14 is inserted through and fastened in a hole in the disc 15, and the chain 6 is placed in the eye of the screw eye 14 and fastened to the hook 9. Then pressure exerted on the handle 1 will cause separation of the tire from the rim.

It is of course understood that various departures may be made from the specific structure set forth herein without departing from the spirit of this invention or the scope of the appended claim.

Having now described our invention, we claim:

A tire remover comprising an elongated handle, a chain connected to an end portion of the handle, a stop arm projecting transversely of the handle at substantially a right angle thereto, near the chain, and a spade or tire-engaging blade extending transversely of the handle, located near the stop arm and mounted on another arm, the said arm and spade extending in approximately the same direction from the handle, the spade being curved toward the stop arm, at its forward edge.

EDMUND J. VERDICK.
JOSEPH L. WHITE.

REFERENCES CITED

The following references are of record in the file of this patent:

UNITED STATES PATENTS

| Number | Name | Date |
|---|---|---|
| 2,305,886 | Mahler | Dec. 22, 1942 |
| 2,391,626 | Howard | Dec. 25, 1945 |

FOREIGN PATENTS

| Number | Country | Date |
|---|---|---|
| 817,844 | France | Sept. 11, 1937 |